US007499832B2

(12) United States Patent
Baker et al.

(10) Patent No.: US 7,499,832 B2
(45) Date of Patent: Mar. 3, 2009

(54) CONTROL UNIT THAT MANAGES THE USAGE OF ELECTRICAL DEVICES

(75) Inventors: Brian Baker, Boulder, CO (US); Tom L. Gallop, Boulder, CO (US)

(73) Assignee: Hopscotch Technology, Boulder, CO (US)

( * ) Notice: Subject to any disclaimer, the term of this patent is extended or adjusted under 35 U.S.C. 154(b) by 14 days.

(21) Appl. No.: 11/685,047

(22) Filed: Mar. 12, 2007

(65) Prior Publication Data

US 2007/0276511 A1 Nov. 29, 2007

Related U.S. Application Data

(60) Provisional application No. 60/803,319, filed on May 26, 2006, provisional application No. 60/718,848, filed on Sep. 20, 2005.

(51) Int. Cl.
*G06F 19/00* (2006.01)
*G06F 17/40* (2006.01)

(52) U.S. Cl. .......................... 702/176; 340/635; 377/1; 377/16; 700/90; 702/1; 702/127; 702/178; 702/187; 702/188; 702/189; 713/340

(58) Field of Classification Search ..................... 377/1, 377/16; 340/500, 540, 635, 679; 700/1, 700/22, 23, 25, 26, 90; 702/1, 57, 60, 64, 702/79, 127, 176, 178, 187, 188, 189; 705/400, 705/418; 713/300, 340
See application file for complete search history.

(56) References Cited

U.S. PATENT DOCUMENTS 2,855,993 A * 10/1958 Rahmel ......................... 368/9
3,221,150 A * 11/1965 Goodwin ..................... 377/16
4,618,780 A * 10/1986 Ikoma et al. ................ 307/130
5,231,310 A 7/1993 Oh
5,331,353 A 7/1994 Levenson et al.
5,872,704 A * 2/1999 Kim ............................ 363/20
6,141,764 A * 10/2000 Ezell .......................... 713/340
2006/0273663 A1* 12/2006 Emalfarb .................... 307/126
2007/0079323 A1* 4/2007 Baker et al. ................... 725/25
2007/0276517 A1* 11/2007 Baker et al. ................... 700/83
2007/0276518 A1* 11/2007 Baker et al. ................... 700/83
2007/0276519 A1* 11/2007 Baker et al. ................... 700/83
2007/0276520 A1* 11/2007 Baker et al. ................... 700/83

FOREIGN PATENT DOCUMENTS

EP 0 369 782 A2 * 5/1990

* cited by examiner

*Primary Examiner*—Edward R Cosimano
(74) *Attorney, Agent, or Firm*—Duft Bornsen & Fishman, LLP

(57) ABSTRACT

A control unit is disclosed for controlling the usage of an electrical device, such as a television. The control unit maintains a plurality of time accounts for a plurality of users. The control unit, responsive to receiving a request to operate the electrical device from a user, identifies a time account for the user and begins decrementing time from the time account for the user when the electrical device is turned on. The control unit decrements time from the time account based on one or more desired algorithms. The algorithms as disclosed herein cause the control unit to continue decrementing time from the time account of the user even after the electrical device is shut off.

8 Claims, 13 Drawing Sheets

CONTROL UNIT THAT MANAGES THE USAGE OF ELECTRICAL DEVICES

RELATED APPLICATIONS

This non-provisional application claims priority to expired U.S. provisional application 60/803,319, filed on May 26, 2006 and to U.S. provisional application Ser. No. 60/718,848, filed on Sep. 20, 2005, which are both incorporated herein by reference as if fully provided herein.

BACKGROUND OF THE INVENTION

1. Field of the Invention

The invention is related to the field of electrical devices, and in particular, to a control unit for managing the usage of electrical devices, such as televisions, computer monitors, video game systems, etc.

2. Statement of the Problem

In the current technological era, children use electrical devices on a daily basis potentially for hours. Children might watch television from the time they get home after school until they go to bed. Teenagers may surf the Internet or exchange emails for hours on a nightly basis. Parents struggle with how to limit the time their children use these and other electrical devices.

Present control units have been developed to control the time a child may spend watching television. The present control units are external devices that control the AC power to a television. A user, such as a child, enters a special code or number into the control unit and the control unit decrements time from the user's account when the television is on. When the time in the user's account is depleted, the control unit interrupts power to the television and the television cannot be viewed. Present control units such as this are disclosed in U.S. Pat. Nos. 5,231,310 and 5,331,353.

There are many drawbacks to the present control units. The present control units do not provide protection mechanisms for the electrical devices with which they connect. For instance, in U.S. Pat. No. 5,331,353, the control unit stops decrementing from a user's account when the electrical device is shut off. A user may then shut a television off during commercials to avoid debiting of their account during those commercials. Turning a television on and off in such a manner can damage a television over time, especially large projection televisions. The present control units are also difficult to use and are substantially inflexible as to how time is added to or decremented from the user's account. It would be desirable to have an improved control unit.

SUMMARY OF THE SOLUTION

The invention helps solve the above problems with an improved control unit for managing usage of electrical devices. A control unit in one embodiment includes a processing system and memory adapted to maintain a plurality of time accounts for a plurality of users. A time account indicates an amount of time assigned to a particular user for usage of the electrical device over a time period, such as a day, a week, etc.

Responsive to receiving a request to operate the electrical device from a user, the processing system identifies a time account for the user. The processing system also begins decrementing time from the time account for the user based on an algorithm when the electrical device is turned on by the user. During usage of the electrical device, the processing system decrements time from the time account of the user according to the algorithm, or determines an amount of time according to the algorithm to decrement from the time account of the user at a later time.

The processing system also monitors the on/off status of the electrical device through a current sensing system. Responsive to determining that the electrical device has been shut off, the processing system continues to decrement time from the time account of the user according to the algorithm after the electrical device is shut off. One or more desired algorithms may be used to decrement time from the time account of the user after the electrical device is shut off. By decrementing time after the electrical device is turned off (e.g., usage has ended) according to an algorithm, the user is advantageously deterred from shutting the device off periodically to save usage time. For instance, if the electrical device is a television, a child may turn off the television during commercials to save time on their time account. Turning televisions on and off frequently may damage the television over time, especially for large screen or projection televisions. By continuing the decrementing process after the television is turned off, the user will not benefit from turning the television on and off during commercials as the time the television is turned off will still be decremented from the time account of the user according to the algorithm.

In another embodiment, an algorithm defines decrementing time from the time account of the user in a defined time block, such as a one minute block, a two minute block, a five minute block, etc. The processing system continues to decrement from the time account of the user after the electrical device is shut off until the next time block according to this algorithm. As an example, assume that a defined time block of five minutes is used. If the electrical device is used for twenty-seven minutes and shut off, then the processing system decrements the usage in five minute blocks until the electrical device is shut off. After the electrical device is shut off, the processing system continues decrementing time from the time account of the user until the next five minute block, which is the thirty minute mark.

In another embodiment, an algorithm defines that time is decremented by rounding up or down to the closest defined time block. The processing system continues to decrement from the time account of the user after the electrical device is shut off by rounding up or down to the closest defined time block.

In another embodiment, an algorithm defines that time is decremented from the time account of the user based on actual usage of the electrical device and based additionally on the on/off status of the electrical device over a time period. To decrement based on the on/off status of the electrical device, the processing system may monitor the on/off status of the electrical device over the time period, estimate the amount of time the electrical device was shut off during the time period, and decrement the time account of the user based on the estimated time the electrical device was shut off during the time period. The processing system may alternatively monitor the on/off status of the electrical device, identify a threshold number of on/off/on changes in the electrical device, and decrement a defined amount of time from the time account of the user based on the number of on/off/on changes.

In addition to automatically decrementing time from the time account of a user after the electrical device has been shut off, the control unit may allow for manual changes to the time account (adding or decrementing) in one embodiment. For the manual changes, the processing system receives a manual account change indication from a user, queries the user to input a time account, queries the user to input an amount of time, and adjusts the time account based on the amount of time inputted by the user.

In another embodiment, the control unit further includes a cutoff system adapted to interrupt power or content to the electrical device. The processing system may instruct the cutoff system to interrupt power or content to the electrical device responsive to determining that the electrical device has been shut off or responsive to determining that the time account of the user is depleted. In some embodiments, the processing system may wait a time period before instructing the cutoff system to interrupt power to the electrical device to allow time for the electrical device to cool down.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-17 and the following description depict specific embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Control Unit Configuration and Operation

Figure 1:
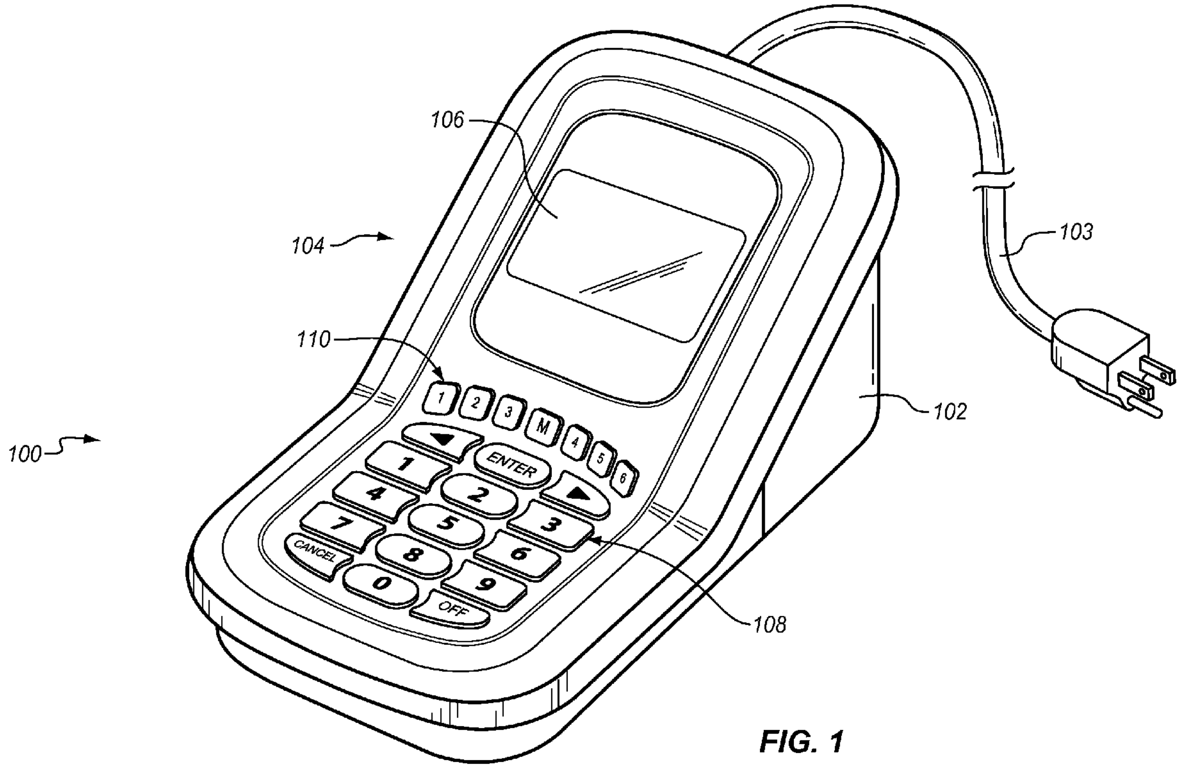
FIG. 1 is a front view of a control unit in an exemplary embodiment of the invention.

FIG. 1 is a front view of a control unit 100 in an exemplary embodiment of the invention. Control unit 100 is configured to control usage of electrical devices, such as a television, computer, computer monitor, etc. Control unit 100 is external to the electrical device being controlled in this embodiment, but may be integrated in some fashion with the electrical device in other embodiments.

Control unit 100 includes an enclosure 102, a power cord 103, and a user interface 104. Enclosure 102 may include any desired shape or configuration, as one example is shown in FIG. 1. Power cord 103 is configured to connect to a power source, such as a wall outlet providing 120 V AC. User interface 104 is configured to receive input or instructions from a user and to convey output or information to the user. User interface 104 in this embodiment includes a display 106 (e.g., a Liquid Crystal Display), a keypad 108, a plurality of LED's 110, and a speaker (not shown). User interface 104 may differ in other embodiments, such as by having a touch screen, a pointing device, voice recognition, or any other form of interface technology, all of which are within the scope of the invention.

Figure 2:
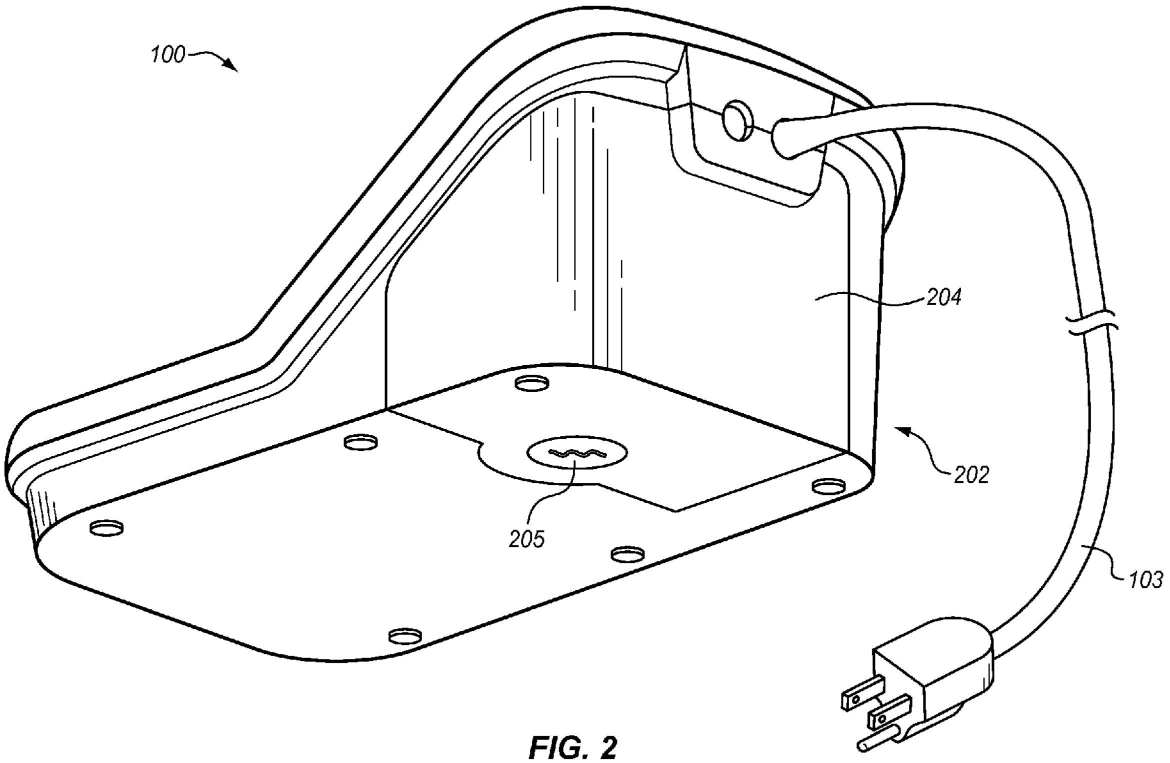
FIG. 2 is a rear view of the control unit in an exemplary embodiment of the invention.

FIG. 2 is a rear view of control unit 100 in an exemplary embodiment of the invention. Control unit 100 includes a means or mechanism of securing a power source or a content source from an electrical device, such as locked compartment 202. Locked compartment 202 is secured with access cover 204 that is secured in place with a locking mechanism 205.

Figure 3:
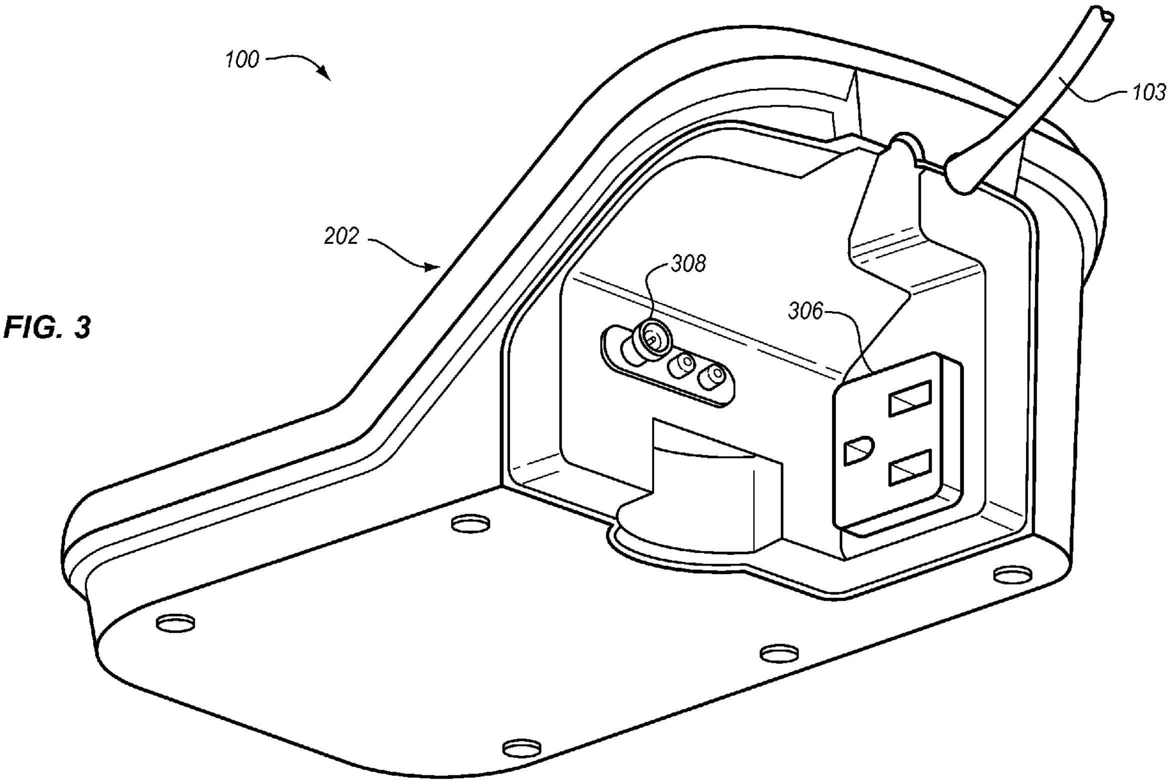
FIG. 3 is another rear view of the control unit in an exemplary embodiment of the invention.

FIG. 3 is another rear view of control unit 100 in an exemplary embodiment of the invention. The view in FIG. 3 is with access cover 204 removed from locked compartment 202. Inside locked compartment 202 is a power receptacle 306 adapted to receive a power cord from an electrical device, such as an AC power cord or cable from a television. When access cover 204 is removed, a power receptacle 306 is accessible for plugging a power cord into or unplugging a power cord from power receptacle 306. When access cover 204 is secured in place by locking mechanism 205, power receptacle 306 is not accessible. A power cord plugged into power receptacle 306 cannot be unplugged with access cover 204 in place (see FIG. 2). Thus, children cannot circumvent control unit 100 by removing the electrical device from control unit 100. Other desired security mechanisms may be used to prevent tampering.

Although a power receptacle 306 is shown in FIG. 3, control unit 100 may include other additional or alternative receptacles for other types of cords or cables used by electrical devices. For instance, control unit 100 may include a content receptacle 308 adapted to receive a content or data cord from an electrical device, such as a cable TV coaxial cable from a television or cable box, a video cable, an audio cable, etc. Content receptacle 308 may comprise an RJ-59 connector, RCA connectors (audio or video), or another type of connector or plug. When access cover 204 is removed, content receptacle 308 is accessible for plugging a content or data cord into or unplugging the content or data cord from content receptacle 308. When access cover 204 is secured in place by locking mechanism 205, content receptacle 308 is not accessible. A content or data cord plugged into content receptacle 308 cannot be unplugged with access cover 204 in place (see FIG. 2). If a content receptacle 308 is used, then control unit 100 may further include a content cord (not shown) that connects to the content supply, such as a cable TV wall plug.

Figure 4:
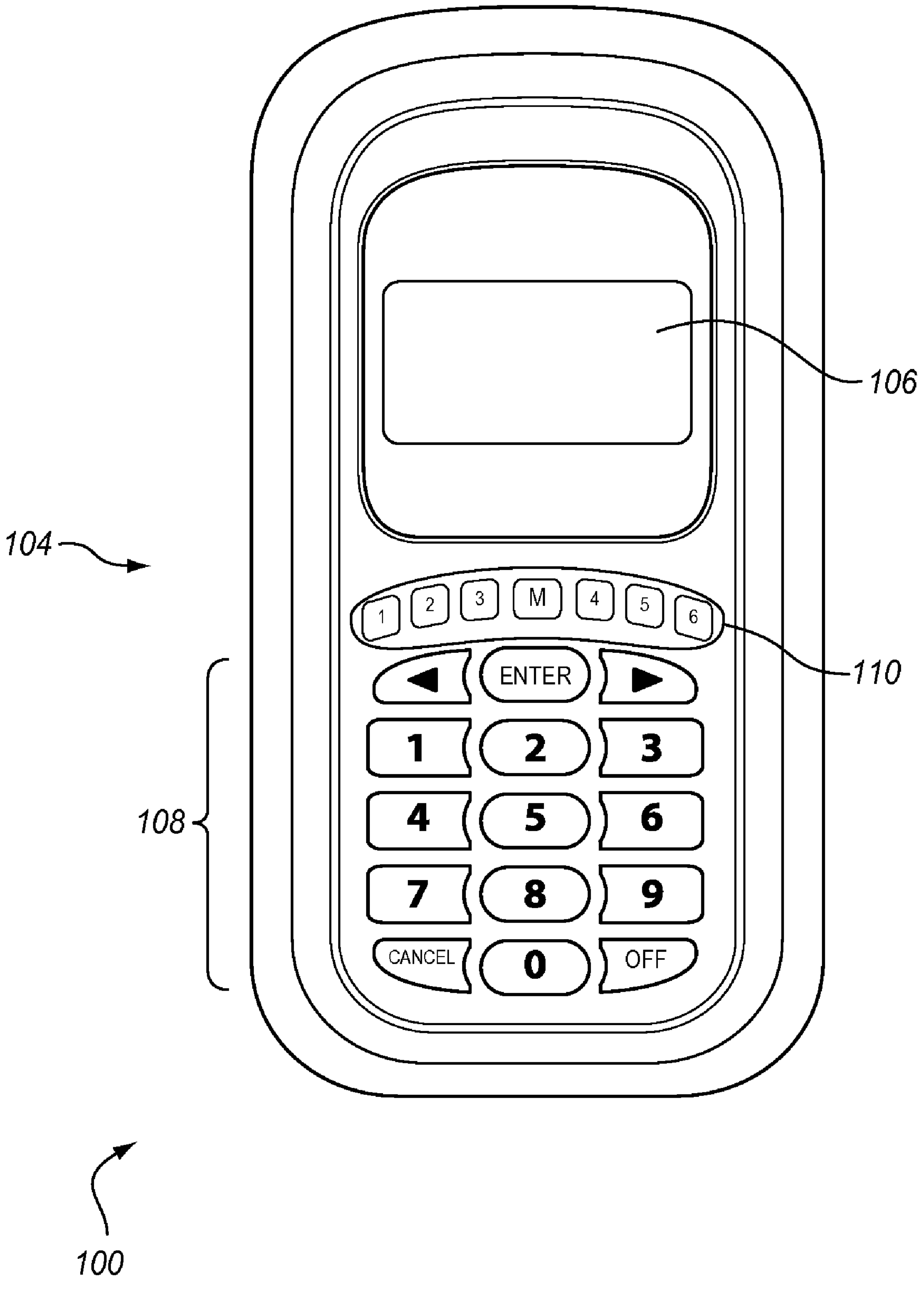
FIG. 4 is a top view of the control unit in an exemplary embodiment of the invention.

FIG. 4 is a top view of control unit 100 in an exemplary embodiment of the invention. Control unit 100 includes display 106, keypad 108, and LEDs 110. In this embodiment, keypad 108 includes number keys, a cancel key, an off key, an enter key, and left and right arrow keys. LEDs 110 include a LED for each user and an LED for the master user. The LED that is illuminated corresponds with the user presently registered with control unit 100.

Figure 5:
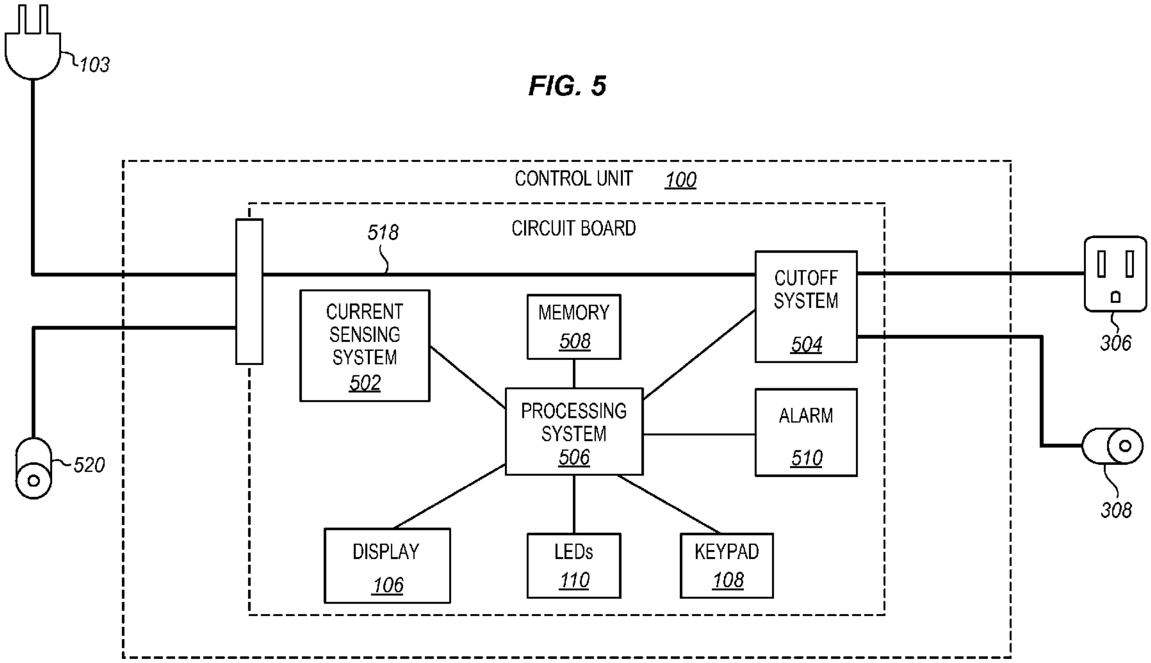
FIG. 5 is a diagram illustrating the internal circuitry of the control unit in an exemplary embodiment of the invention.

FIG. 5 is a diagram illustrating the internal circuitry of control unit 100 in an exemplary embodiment of the invention. Control Unit 100 includes a current sensing system 502, a cutoff system 504, a processing system 506, a memory 508, and an alarm 510. Processing system 506 is connected to display 106, keypad 108, and LEDs 110. Also illustrated are a power cord 103 and a power receptacle 306 for control unit 100, and a content receptacle 308 and a content cord 520 (if needed). Control unit 100 may include other components, devices, and systems not shown for the sake of brevity.

Current sensing system 502 comprises any device or component that senses a current traveling over a conductor 518. Current sensing system 502 may comprise a non-intrusive device that does not directly connect with the conductor 518. For instance, current sensing system 502 may be positioned proximate or adjacent to the conductor 518, but not in the conductive path of the conductor 518. Current sensing system 502 may be adapted to sense a power current, such as an AC current traveling from power cord 103 to power receptacle 306 over conductor 518. Current sensing system 502 may also be adapted to sense a content or data current, such as a cable TV signal traveling from content cord 520 to content receptacle 308 over conductor 518.

Cutoff system 504 comprises any device or component that is adapted to interrupt power or content being provided to an electrical device. One example of cutoff system 504 is a relay. Cutoff system 504 may be coupled to the power path of the electrical device so that it may interrupt or cut off power to the electrical device. Alternatively, cutoff system 504 may be coupled to a content path of the electrical device so that it may interrupt or cut off content or data being provided to the electrical device. For instance, if the electrical device is a television, then cutoff system 504 may be coupled to a coaxial cable running from the cable box to the television to interrupt the content being provided to the television over the coaxial cable.

Processing system 506 comprises one or more processors adapted to execute instructions or code to perform functions. Memory 508 comprises any desired memory device. Memory 508 may be resident on the same circuit board as processing system 506 as is common in many processor applications. Memory 508 may also be a separate component, such as an EPROM, that is accessible to processing system 506 through a system bus.

To hook up control unit 100, a power cord for an electrical device, such as a television, may be plugged into power receptacle 306 (see also FIG. 3). The power cord may then be secured by attaching access cover 204 to locked compartment 202 through locking mechanism 205 (see FIGS. 2-3). Power cord 103 is then plugged into a power source, such as a wall outlet. Control unit 100 is then powered up.

Additionally or alternatively, a content cord for an electrical device, such as coaxial cable, may be plugged into content receptacle 308 (see also FIG. 3). The content cord may then be secured by attaching access cover 204 to locked compartment 202 through locking mechanism 205 (see FIGS. 2-3). Content cord 520 is then plugged into a content source, such as a cable TV wall outlet.

After control unit 100 is connected to the electrical device, control unit 100 is setup or initialized. Processing system 506 may guide the users through the setup by displaying questions or commands on display 106. As a brief summary, time accounts are set up for one or more users. The time accounts indicate an amount of time assigned to a particular user for usage of the electrical device over a time period, such as a week, a month, etc. As part of the setup, a user enters a password or access code for their time account. The time accounts are initialized and an initial time is allotted for a time period, such as ten hours of usage for a week period. The initial allotted time and time period are flexible and may be designated by a master user, such as a parent.

Figure 6:
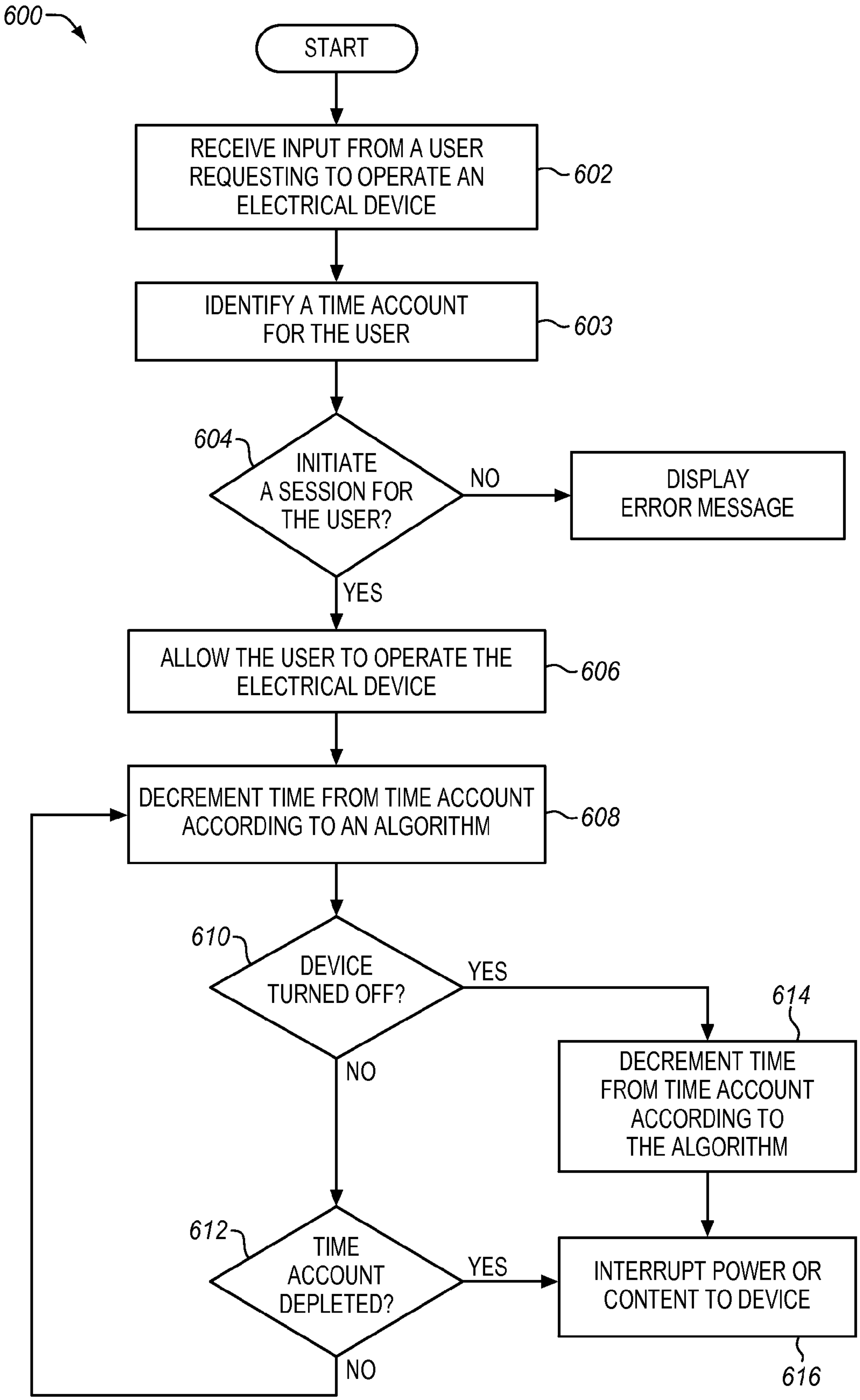
FIG. 6 is a flow chart illustrating an exemplary method of operating the control unit in an exemplary embodiment of the invention.

FIG. 6 is a flow chart illustrating an exemplary method 600 of operating control unit 100 in exemplary embodiment of the invention. Method 600 is described with reference to control unit 100 shown in FIGS. 1-5. Assume that a user (child) wants to operate or use an electrical device, such as a television. The user enters some type of input into control unit 100, such as entering his/her access code through keypad 108, providing a fingerprint through an appropriate interface, etc. Processing system 506 then receives the input from the user requesting to operate the electrical device (step 602). Responsive to receiving the input, processing system 506 identifies a time account for the user (step 603). Processing system 506 then determines whether or not to initiate a session for that user (step 604). For instance, processing system 506 accesses the time account for the user to determine if there is time left in the time account. Processing system 506 may also determine whether or not the present session would be in a time frame that is blocked for the user. If processing system 506 determines, in step 604, that the session may not be initiated, then an error message is displayed. On the other hand, if processing system 506 determines that the session may be initiated, then processing system 506 allows the user to operate the electrical device (step 606). To allow the user to operate the electrical device, processing system 506 may communicate with cutoff system 504 to allow power or content to be applied to the electrical device. For instance, if cutoff system 504 is a relay, then processing system 506 turns the relay on to allow the user to operate the electrical device.

Processing system 506 also begins decrementing time from the user's time account according to a desired algorithm (step 608) as described further below. Processing system 506 may decrement time from the user's time account according to the algorithm in an active manner meaning that the time account is actually debited in real time. Processing system 506 may alternatively determine an amount of time to decrement according to the algorithm, and then decrement the time from the time account at a later time, such as after the electrical device has been shut off. Processing system 506 may wait for a time period before decrementing time from the time account to give the user time to turn on the electrical device. Processing system 506 may alternatively monitor when the user turns the electrical device on through the current sensing system 502 to determine when to begin decrementing time from the time account. Processing system 506 also indicates to the user that a session has been established, such as by illuminating an LED 110, playing a sound or sounds, displaying a message on display 106, etc.

When the electrical device is not turned off or is being turned on by the user and is being operated, processing system 506 monitors the usage status of the electrical device through current sensing system 502 (step 610). For instance, current sensing system 502 may monitor the on/off status of the electrical device by monitoring the power being supplied to the electrical device. Current sensing system 502 may monitor the status of the electrical device by monitoring the content being supplied to the electrical device. Processing system 506 also monitors the time account of the user (step 612), which includes determining if the user has time left in their time account (e.g., determines if the time account depleted) and possibly decrementing time from the time account as the electrical device is being used. If processing system 506 determines that the user has time left in their time account (e.g., time account is not depleted), then processing system 506 returns to step 608.

If processing system 506 determines that usage of the electrical device has ended, such as the electrical device being turned off, then the session has ended and processing system 506 decrements time from the user's time account according to the desired algorithm (step 614) after the electrical device is shut off. By decrementing time from the time account according to the algorithm, time decrementing is performed in a different manner than present control units. Time is decremented, according to the algorithm, based on actual usage time and additional time. The additional time is time that is decremented even after the electrical device is shut off. There are multiple purposes for decrementing additional time from the time account, such as protecting the electrical device from being frequently turned on and off, defining the minimum time blocks for which a user may operate an electrical device, etc.

Processing system 506 may also communicate with cutoff system 504 to instruct cutoff system 504 to interrupt power or content (or both) to the electrical device (step 616). For instance, if cutoff system 504 is a relay, then processing system 506 turns the relay off.

If processing system 506 determines that the time account of the user is depleted, then processing system 506 communicates with cutoff system 504 to instruct cutoff system 504 to interrupt power or content (or both) to the electrical device (step 616). Processing system 506 may also indicate that the time account is depleted by turning off an LED 110, playing a sound or sounds, or displaying a message on display 106, for example. There may be other ways to end a session, such as the user entering an end code in control Unit 100 or another user entering his/her access code to initiate a new session for that user.

Processing system 506 may wait for a time period before interrupting power to the electrical device through cutoff system 504 in some embodiments to allow for cool down (also referred to as cool down mode). In some electrical devices, such as projection televisions (LCDs, DLPs, or other televisions with a bulb), the electrical device will still draw a power current after the device has been shut off, such as to run a cooling fan.

Figure 7:
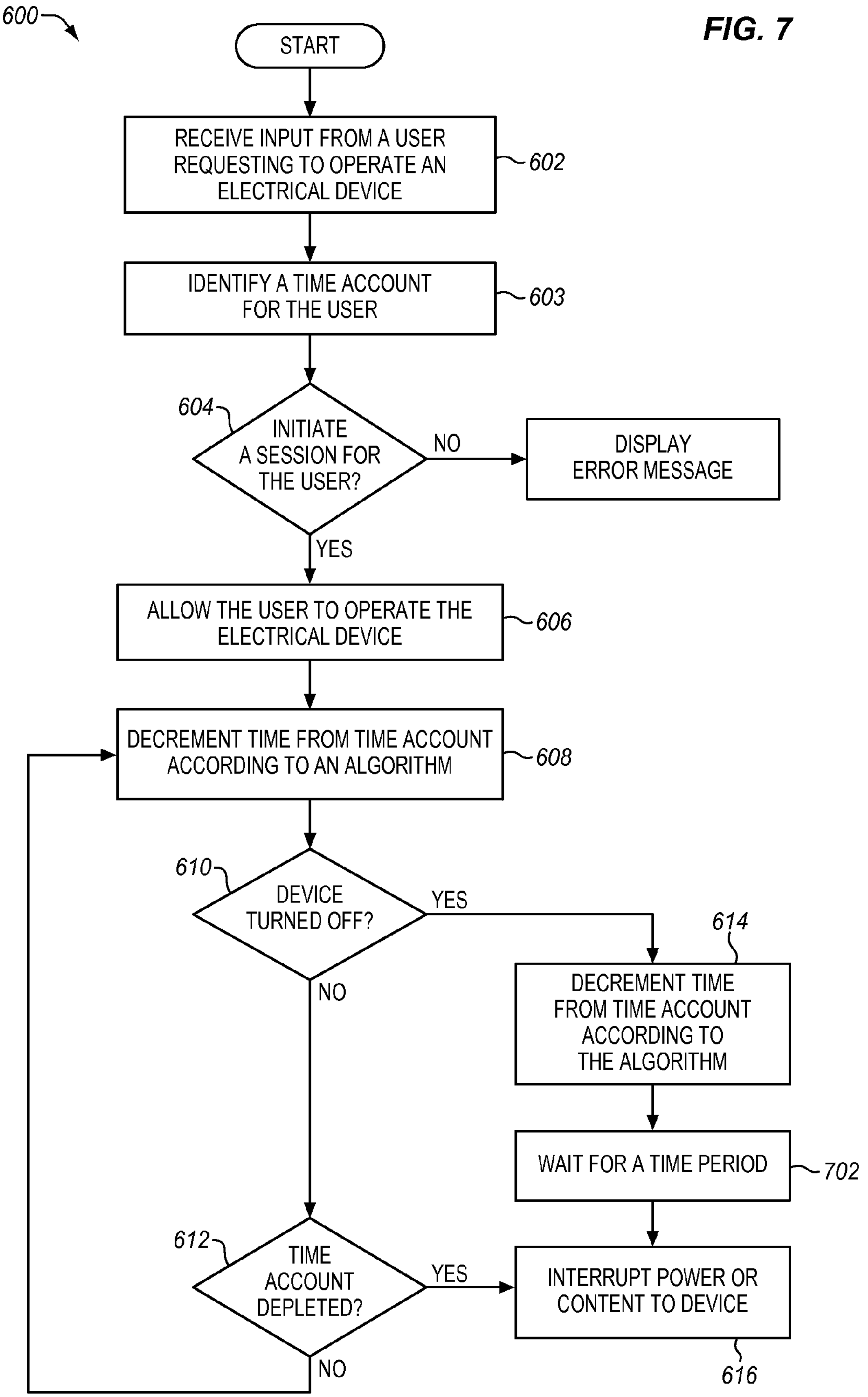
FIG. 7 is a flow chart illustrating the method of FIG. 6 with the addition of a cool down mode in an exemplary embodiment of the invention.

FIG. 7 is a flow chart illustrating method 600 with the addition of a cool down mode in an exemplary embodiment of the invention. If processing system 506 determines that the electrical device has been turned off, such as in step 610, then processing system 506 decrements time from the user's time account according to the desired algorithm (step 614) even after the electrical device has been shut off as in FIG. 6. In addition, processing system 506 waits a threshold time period (step 702), such as thirty seconds, one minute, two minutes, three minutes, etc, before interrupting power to the electrical device. The threshold time period may depend on the type of electrical device. The user may enter the threshold time period into the keypad 108 during setup. The user may alternatively enter information on the electrical device into control unit 100, such as a serial number, a product description, etc, and processing system 506 determines the threshold time period based on the information entered by the user. After the threshold time period, processing system 506 may communicate with cutoff system 504 to interrupt power to the electrical device (step 616).

In another embodiment, processing system 506 does not interrupt power to the electrical device using cutoff system 504 in normal operation (which may be referred to as "always-on" mode). Many electrical devices have programmable elements or settings, such as a clock, a calendar, program settings, etc. The electrical devices require a small current draw in order to maintain the programmable elements or settings. Interrupting power to the electrical devices may cause the programmable elements or settings to be erased, which can be annoying to the user of the electrical device. According to this embodiment of the invention, alarms are used instead of or in addition to interrupting power so as to avoid erasing programmable elements or settings in the electrical device.

Figure 8:
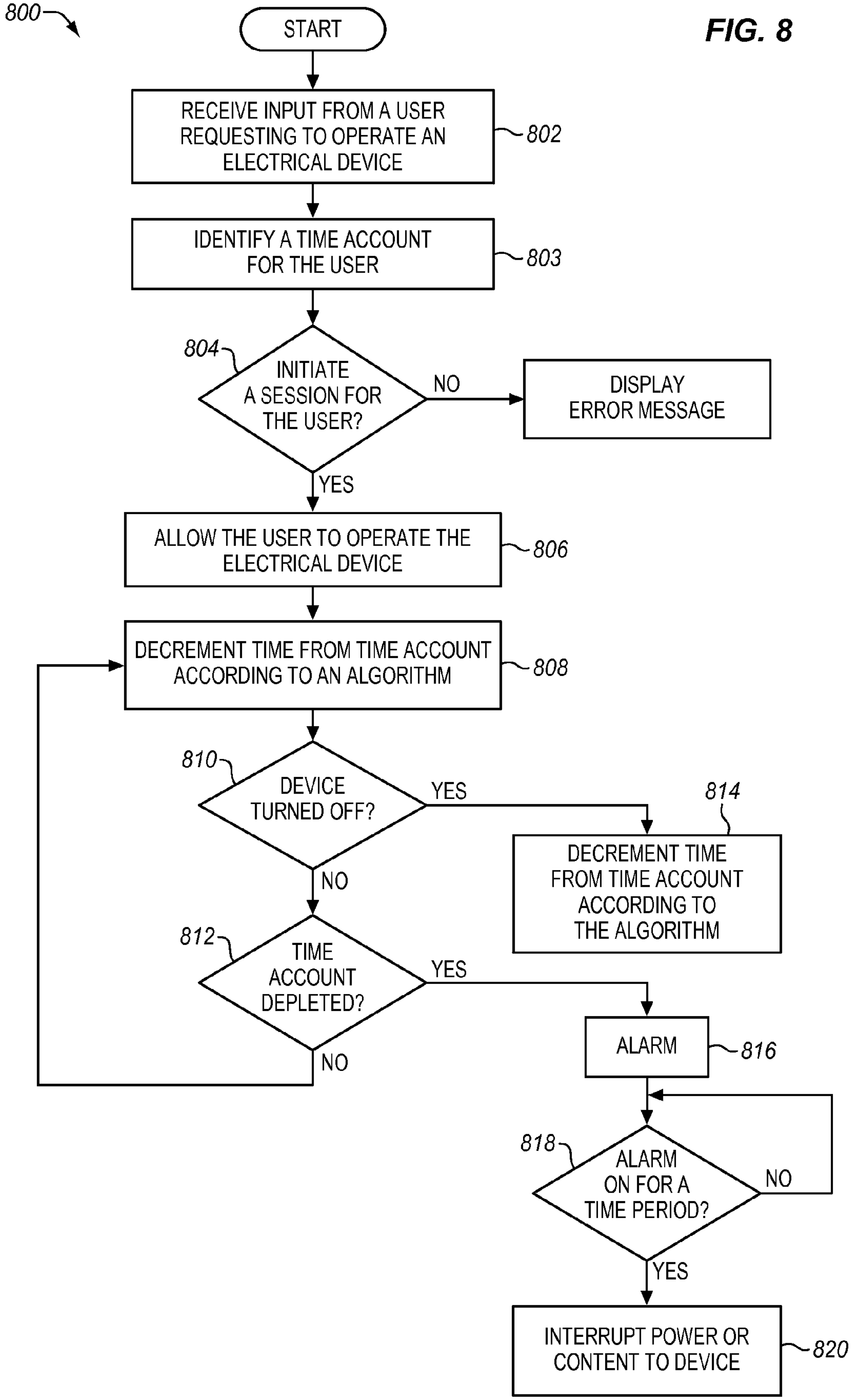
FIG. 8 is a flow chart illustrating another exemplary method of operating the control unit in an exemplary embodiment of the invention.

FIG. 8 is a flow chart illustrating another exemplary method 800 of operating control unit 100 in exemplary embodiment of the invention. Method 800 is described with reference to control unit 100 shown in FIGS. 1-5. Steps 802-814 correspond with steps 602-614 previously described in relation to FIG. 6.

In method 800, processing system 506 does not cut power to the electrical device as in the above embodiments after the electrical device has been shut off or after the time account is depleted. Alternatively, if processing system 506 determines that the time in the time account of the user is depleted, then processing system 506 triggers alarm 510 (step 816). Alarm 510 may be an audible alarm, a visual alarm, or a combination of both. Alarm 510 indicates that a user is no longer allowed to use the electrical device (i.e., time account is depleted, present time is a blocked time, etc). The sound or format of the alarm may be different for different users, may be different for different usage violations, and/or may be configurable by the master user.

Processing system 506 also sets a timer when starting the alarm 510. If processing system 506 determines that alarm 510 has been on for a time period (step 818), then processing system 506 may communicate with cutoff system 504 to interrupt power or content to the electrical device (step 820). Power or content interruption is hopefully a last resort as the alarm 510 is intended to invoke a reaction from the user or the master user to shut off the electrical device.

Processing system 506 may also trigger the alarm for other events to indicate a usage violation. For instance, if the user logs in during a blocked time or is using the electrical device during a blocked time, processing system 506 may trigger alarm 510 as in step 816. Once again, if the alarm 510 is on for a threshold time period, then processing system 506 may instruct cutoff system 504 to interrupt power or content to the electrical device.

In FIGS. 6-8, when the session ends, processing system 506 continues to decrement time from the time account of the user even after the session has ended (e.g., the electrical device has been turned off). Processing system 506 does not stop decrementing time from the instance the electrical device is turned off according to features and aspects described herein. Processing system 506 decrements time from the time account of the user according to one or more desired algorithms, which results in the actual usage time of operating the electrical device being debited from the time account and additional time being debited above and beyond the actual usage time.

One algorithm defines that time is decremented from the time account of the user in a defined time block. The defined time block may be about a thirty second block, a one minute block, a two minute block, a five minute block, a thirty minute block, etc. The exact time of the time block is not crucial, as a two minute time block may actually be two minutes and two seconds or some other time. According to this algorithm, processing system 506 decrements time from the time account in the defined time block while the electrical device is being used, and decrements time from the time account after the electrical device is turned off until the next defined time block. By decrementing time after the electrical device is turned off (e.g., usage has ended) according to the defined time blocks, the user is deterred from shutting the device off periodically to save usage time. For instance, if the electrical device is a television, a child may turn off the television during commercials to save time on their time account. Turning televisions on and off frequently may damage the television over time, especially for large screen or projection televisions. By continuing the decrementing process after the television is turned off in two minute blocks, five minute blocks, etc, the user will not benefit from tuning the television on and off during commercials as the time the television is turned off will still be decremented from the time account of the user according to the defined time block.

As an example, assume that a defined time block of five minutes is used. If the electrical device is used for twenty-seven minutes and shut off, then processing system 506 decrements the usage in five minute blocks until the electrical device is shut off. After the electrical device is shut off, processing system 506 continues decrementing time from the time account of the user until the next five minute block, which is the thirty minute mark. In another example, assume that a defined time block of thirty minutes is used. The assumption in this case may be that a typical television viewer watches television in at least half hour blocks. If the television is shut off after fifteen minutes of viewing, then processing system 506 continues decrementing time from the time account of the user after the television is turned off until the thirty minute mark.

Another algorithm defines that time is decremented by rounding up or down to the closest defined time block. The defined time block may be about a thirty second block, a one minute block, a two minute block, a five minute block, a thirty minute block, etc. According to this algorithm, processing system 506 decrements time from the time account in the defined time block while the electrical device is being used, and decrements time from the time account after the electrical device is turned off by rounding up or down to the closest defined time block. For instance, assume that the defined time block is a five minute block. If the electrical device is shut off after 7 minutes and 25 seconds of use, then processing system 506 decrements 5 minutes of usage from the time account. If the electrical device is shut off after 7 minutes and 40 seconds of use, then processing system 506 keeps decrementing from the time account until the 10 minute mark.

Another algorithm defines that time is decremented from the time account of the user based on actual usage of the electrical device and based additionally on the on/off status of the electrical device over a time period. According to this algorithm, processing system 506 decrements time from the time account of the user as the electrical device is being used (possibly in defined time blocks as described above). Processing system 506 also monitors the on/off status (or the off/on status) of the electrical device over a time period. For instance, if the electrical device is a television, then processing system 506 may monitor the on/off status over a time period, such as one hour, two hours, etc. If the television has been shut off periodically during the time period, then processing system 506 may determine that the user is avoiding commercials during the viewing.

Figure 9:
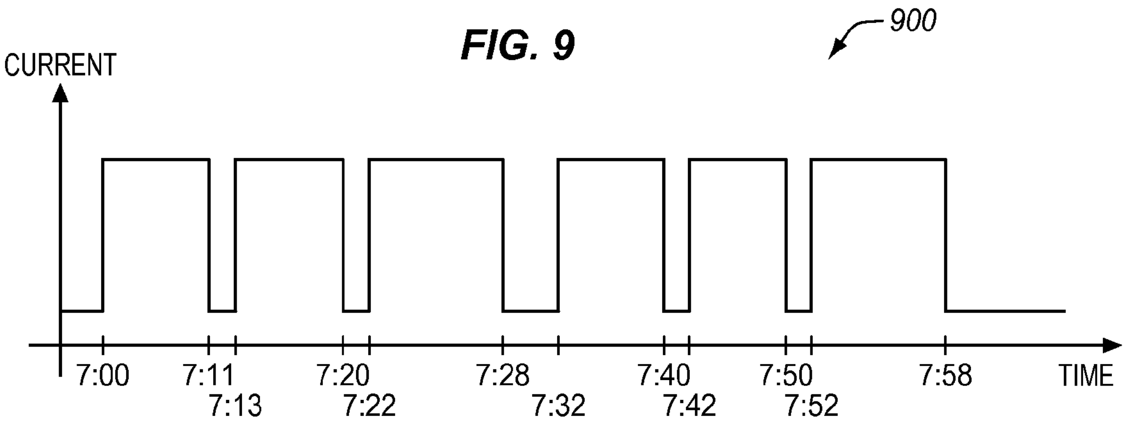
FIG. 9 is a graph illustrating a current draw of a television connected to the control unit in an exemplary embodiment of the invention.

FIG. 9 is a graph 900 illustrating a current draw of a television connected to control unit 100 in an exemplary embodiment of the invention. Graph 900 shows the current draw as a function of time. Graph 900 indicates that television was turned on at 7:00 pm as illustrated by the rise in current. The television was then shut off from 7:11 until 7:13 as illustrated by the temporary drop in the current. The television was then shut off from 7:20 until 7:22, shut off from 7:28 until 7:32, shut off from 7:40 until 7:42, shut off from 7:50 until 7:52, and finally shut off at 7:58. The user was obviously shutting off the television during commercials to avoid drawing on the user's time account during commercials. By avoiding commercials, the actual time attributed to the user was forty-six minutes over this hour time period.

To alleviate the problem of the user turning the television or any other electrical device on and off in this manner, processing system 506 monitors the on and off status of the electrical device over a time period, and estimates the amount of time the electrical device was shut off during the time period. For instance, if an electrical device was shut on and off during time period from 7:00 to 8:00, then processing system 506 may determine that the time period was one hour. Processing system 506 can then estimate how much time the electrical device was shut off during that time period. Processing system 506 may then decrement the time account of the user based on the estimated time the electrical device was shut off during the time period. In the above example, the processing system 506 may decrement an additional 14 minutes from the time account for the time the television was shut off during commercials.

In another alternative of monitoring the on/off status of an electrical device, processing system 506 may identify a threshold number of on/off/on changes in the electrical device, and decrement a defined amount of time (e.g., one minute, two minutes, five minutes, etc) from the time account of the user based on the number of on/off/on changes. For instance, if processing system 506 identifies five on/off/on changes during an hour time period (such as illustrated in FIG. 9), then processing system 506 may decrement two minutes for each on/off/on change (for a total of ten minutes) from the time account of the user.

Processing system 506 may also have protection mechanisms if one or more users try to circumvent the control unit 100. For instance, if a user turns the electrical device on and off a certain number of times in a time period, then processing system 506 may alert the master user. If a user enters the wrong password a certain number of times in a time period, then processing system 506 may alert the master user. If a number of users change the user status in control unit 100 a certain number of times in a time period, then processing system 506 may alert the master user.

Flytime

In addition to the algorithms described above, processing system 506 may also add to or decrement from the time account of a user based on input from a master user. A master user comprises any user with the authority to alter the time account of the users as maintained by control unit 100. A master user, such as a parent, may manually add to the time account of the user (child) as a reward for good behavior. If a child has bad behavior, a parent may manually delete time from the time account of the user as a punishment. Responsive to the input from the master user, processing system 506 adds to or decrements from the time account regardless of whether the electrical device is on or off. This type of decrementing may be referred to as flytime, which is a manual change to the time accounts.

Figure 10:
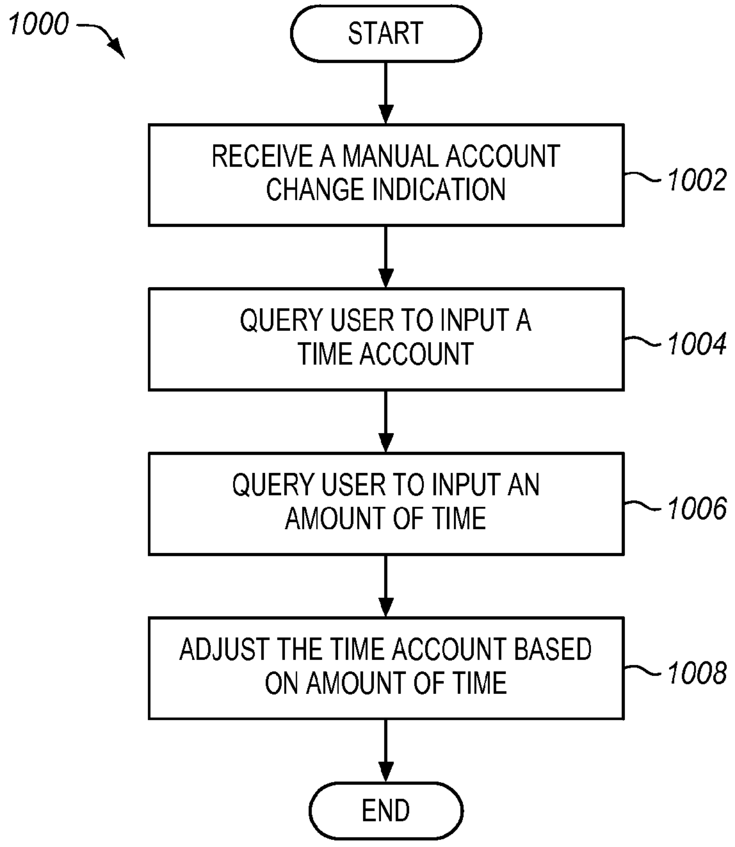
FIG. 10 is a flow chart illustrating a method of implementing flytime in an exemplary embodiment of the invention.

FIG. 10 is a flow chart illustrating a method 1000 of implementing flytime in an exemplary embodiment of the invention. Method 1000 is described with reference to control unit 100 shown in FIGS. 1-5. In step 1002, processing system 506 receives a manual account change indication from the user. For instance, the user may press the left and right arrow keys on keypad 108 to initiate the flytime session (see also FIG. 4). In step 1004, processing system 506 queries the user to input a time account from which the user would like to add time to or decrement time. Responsive to the prompt, the user may enter some indication of the time account, such as a name, a number, etc, which is received by processing system 506. Processing system 506 may also authenticate the user to ensure the user is authorized to change the time accounts. Processing system 506 may query the user for a password, such as a master user password for control unit 100.

In step 1006, processing system 506 queries the user to input the amount of time the user would like to add to or decrement from the time account. For instance, processing system 506 may prompt the user to add time increments, such as ten minutes, fifteen minutes, etc, by pressing the right arrow key in keypad 108 (see also FIG. 4). Processing system 506 may also prompt the user to decrement time increments by pressing the left arrow key in keypad 108. Processing system 506 receives the amount of time inputted by the user. Responsive to the inputs from the user, processing system 506 may then adjust the indicated time account based on the inputs in step 1008.

Sleep Timer

Figure 11:
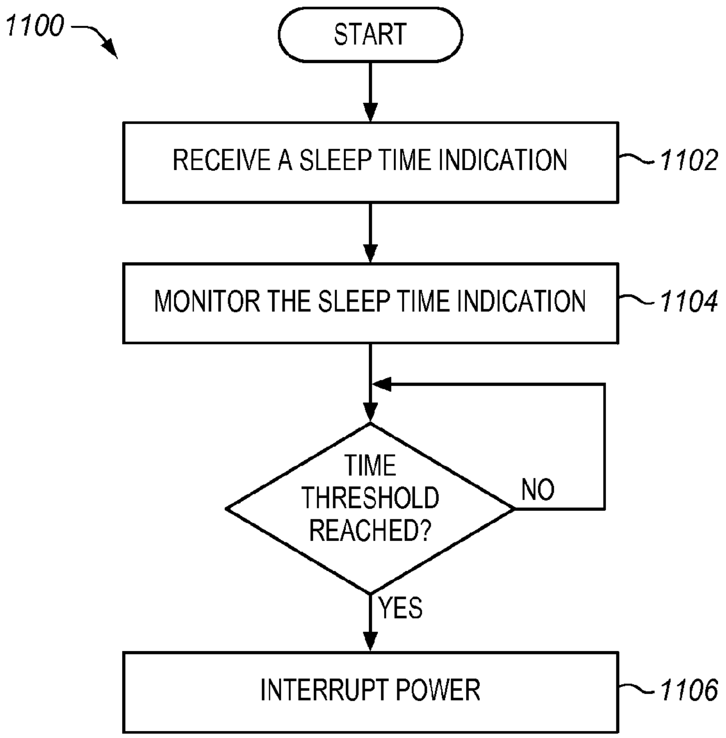
FIG. 11 is a flow chart illustrating a method of operating the control unit to provide the sleep timer in an exemplary embodiment of the invention.

Control unit 100 as shown in FIGS. 1-5 may include the feature of a sleep timer in one exemplary embodiment. FIG. 11 is a flow chart illustrating a method 1100 of operating control unit 100 to provide the sleep timer in an exemplary embodiment. To staff, processing system 506 receives a sleep time indication from the user in step 1102. The sleep time indication may be a number of minutes desired by the user before shutting off the electrical device, such as thirty minutes, one hour, two hours, etc. The sleep time indication may alternatively be a time of day to shut off the electrical device, such as 10:00 pm, 11:00 pm, 12:00 am, etc. Processing system 506 then monitors the sleep time indication from the user to determine if a time threshold has been reached in step 1104. If a time threshold has not been reached, process system 506 continues to wait until the time threshold is reached. If the time threshold has been reached, then processing system 506 communicates with cutoff system 504 to interrupt power to the electrical device in step 1106. For instance, if cutoff system 504 is a relay, then processing system 506 turns the relay off. Interrupting power to the electrical device consequently shuts the electrical device off as desired by the user in initiating the sleep timer.

Peer-to-Peer Networking of Control Units

Figure 12:
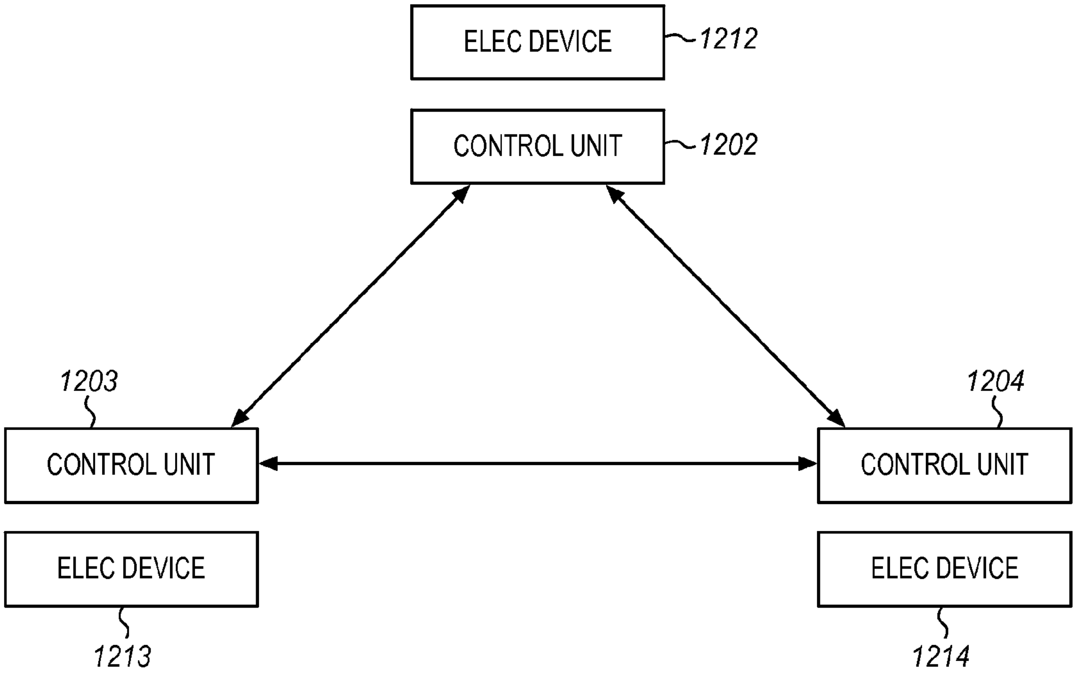
FIG. 12 illustrates a plurality of control units connected to a plurality of electrical devices in an exemplary embodiment of the invention.

A typical residence has multiple electrical devices where it may be desirable to control usage. To control multiple electrical devices, a control unit such as described in FIGS. 1-11 may be connected to each electrical device to be controlled. FIG. 12 illustrates a plurality of control units 1202-1204 connected to a plurality of electrical devices 1212-1214 in an exemplary embodiment of the invention. Each of control units 1202-1204 may control electrical devices 1212-1214 individually in one embodiment. In another embodiment, control units 1202-1204 may be networked, either wireless or wireline, to communicate with one another.

Figure 13:
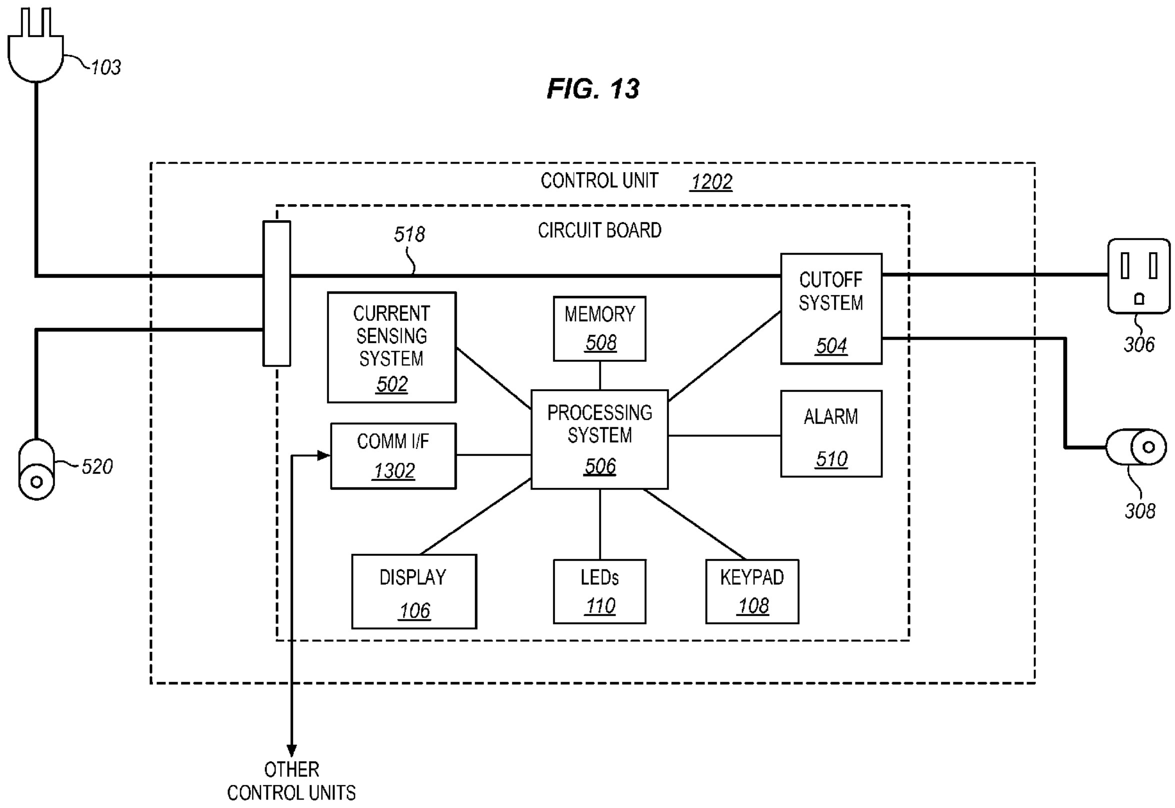
FIG. 13 illustrates the internal circuitry of another control unit in an exemplary embodiment of the invention.

FIG. 13 illustrates the internal circuitry of control unit 1202 in an exemplary embodiment. Control unit 1202 includes similar circuitry as control unit 100 shown in FIG. 5, except that control unit 1202 further includes a communication interface 1302 connected to processing system 506. Communication interface 1302 may comprise a wireless interface, such as an infrared interface, WiFi interface, etc, or a wireline interface, such as a power line interface, a CAT 5 interface, etc.

In the networked environment of FIG. 12, control units 1202-1204 are peer devices. Being peer devices, each control unit 1202-1204 may operate as described in FIGS. 6-8 to monitor usage of an electrical device 1212-1214. Each control unit 1202-1204 maintains its own time accounts for the users. Control units 1202-1204 then periodically synchronize with one another so that the time accounts maintained by each control unit 1202-1204 are the same or substantially the same.

Figure 14:
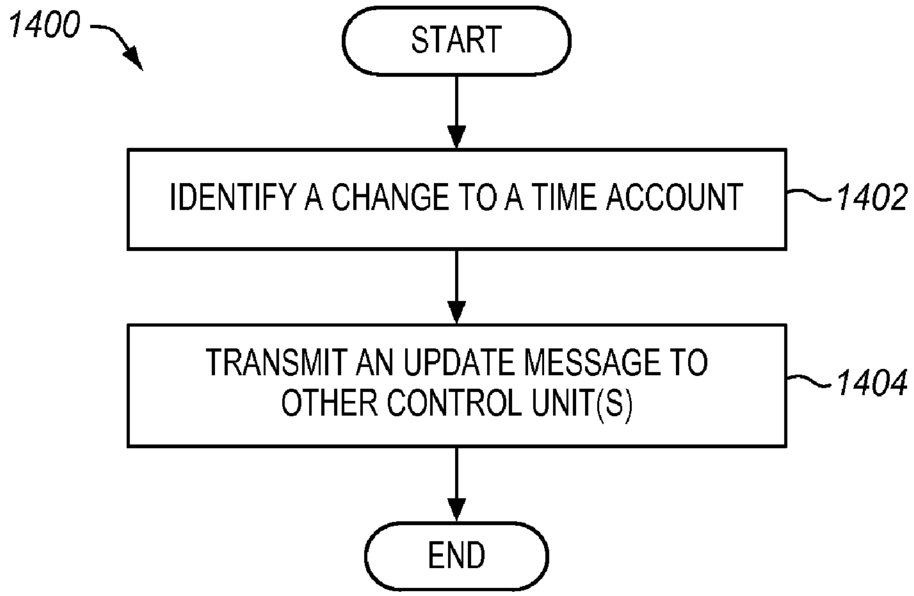
FIG. 14 is a flow chart illustrating a method of operating the control unit of FIG. 13 in a peer-to-peer relationship hi an exemplary embodiment of the invention.

FIG. 14 is a flow chart illustrating a method 1400 of operating a control unit 1202-1204 in a peer-to-peer relationship in an exemplary embodiment. Method 1400 is described with reference to control unit 1202 shown in FIG. 13. In step 1402, the control unit 1202 identifies a change to a time account. The time account is being locally maintained by control unit 1202 based on usage of electrical device 1212. Control unit 1202 does not need to ask for permission, such as from a master unit, to maintain the time account. In step 1404, control unit 1202 transmits an update message to at least one of control units 1203-1204. The update message includes information on one or more of the time accounts that have been changed in control unit 1202, such as a time account identifier, an amount of time added to or subtracted from the time account, etc. Control unit 1202 may transmit the update message responsive to changing a time account by a threshold amount of time, such as by decrementing two minutes of time, decrementing five minutes of time, decrementing fifteen minutes of time, etc. Control unit 1202 may alternatively transmit the update message periodically regarding one or more of the time accounts. Changes may or may not have been made to the time accounts in control unit 1202, but control unit 1202 may transmit the update message(s) to ensure that the control units 1202-1204 are all synchronized.

Figure 15:
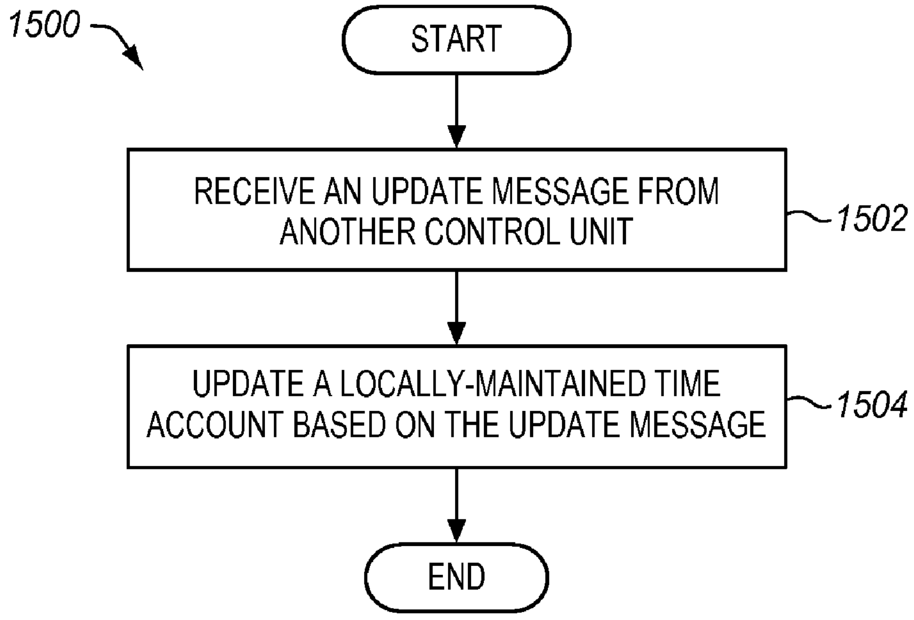
FIG. 15 is a flow chart illustrating another method of operating the control unit of FIG. 13 in a peer-to-peer relationship in an exemplary embodiment of the invention.

FIG. 15 is a flow chart illustrating another method 1500 of operating a control Unit 1202-1204 in a peer-to-peer relationship in an exemplary embodiment. Method 1500 is described with reference to control unit 1202 shown in FIG. 13. Control unit 1203 and/or control Unlit 1204 receives the update message from control unit 1202 in step 1502. Responsive to receiving the update message, the control units 1203-1204 update their locally-maintained time accounts based on the update message in step 1504. To update the time account, control units 1203-1204 may process the update message to identify the time account(s) to update, and to identify other information used for the update, such as an amount of time to add to or decrement from the identified time account(s). For instance, if the update message indicates that time account 1 has been decremented by 15 minutes in control unit 1202, then control units 1203-1204 may decrement their locally-maintained time account 1 to synchronize with control unit 1202. This peer-to-peer configuration advantageously allows a user to control usage on multiple electrical devices without having to program time accounts into each individual control unit.

Standby Current Determination

Figure 16:
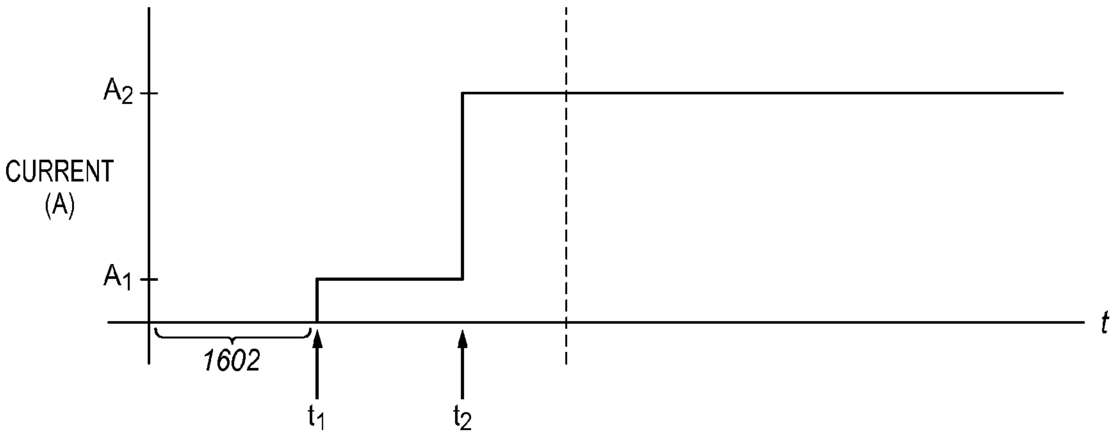
FIG. 16 is a graph illustrating a current draw of an electrical device connected to a control unit in an exemplary embodiment of the invention.

FIG. 16 is a graph illustrating a current draw of an electrical device connected to control unit 100 in an exemplary embodiment of the invention. Some electrical devices draw standby current even when the device is off. For instance, a television draws a small standby current when the television is off to maintain volatile memories, to illuminate clocks, etc. The level of standby current that is drawn depends on the size and needs of the electrical device. For some larger devices that draw a large standby current, it may be difficult to determine whether a device is on or off by measuring the current.

Referring to FIG. 16, the first section 1602 of graph illustrates current being cutoff to the electrical device by control unit 100. During this time, no current flows to the electrical device. At time $t_1$, processing system 506 in control unit 100 communicates with cutoff system 504 to allow power to be applied to the electrical device (see FIG. 5). This may be responsive to a user entering a valid access code into control unit 100. With cutoff system 504 allowing power to be applied to the electrical device, the electrical device draws a standby current $A_1$. The level of standby current $A_1$ may be high or low depending on the electrical device. At time $t_2$, the electrical device is turned on by the user. With the electrical device turned on, the electrical device draws an active current $A_2$. The active current $A_2$ is generally much higher than the standby current $A_1$.

Figure 17:
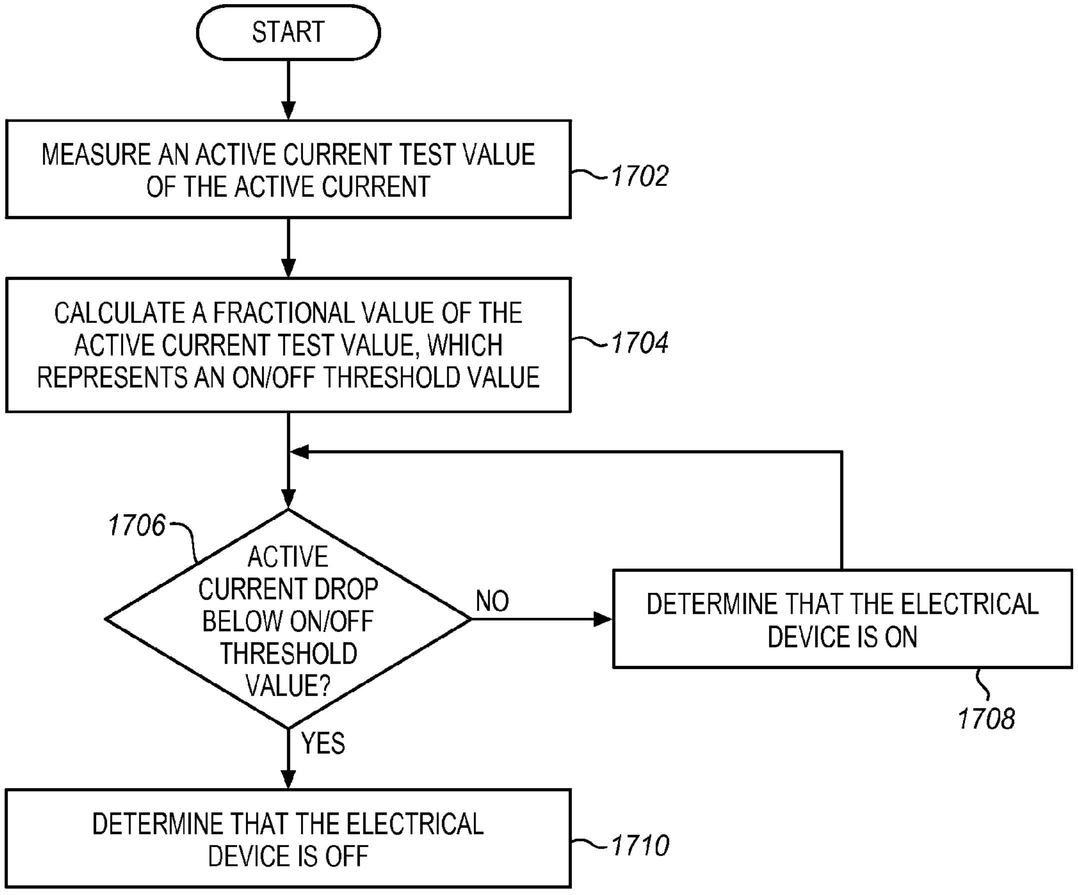
FIG. 17 is a flow chart illustrating an algorithm to determine whether an electrical device is on or off in an exemplary embodiment of the invention.

FIG. 17 is a flow chart illustrating an algorithm to determine whether the electrical device is on or off in an exemplary embodiment of the invention. The algorithm is described with reference to control unit 100 shown in FIGS. 1-5. In step 1702, processing system 506 measures an active current test value of the active current $A_2$ drawn by the electrical device (shown as the dotted line on FIG. 16). The active current test value may be measured a particular time period after a session has been initiated on control unit 100. For instance, processing system 506 may wait thirty seconds after the session has been initiated to take the active current test value measurement. In step 1704, processing system 506 calculates a fractional value of the active current test value, which represents an on/off threshold value for the electrical device. For instance, the fractional value may be 60%, 65%, 70%, etc, of the active current test value to determine the on/off threshold value of the electrical device. In step 1706, processing system 506 then monitors the active current $A_2$ to determine if the active current $A_2$ drops below the on/off threshold value. If the active current $A_2$ stays above the on/off threshold value, then processing system 506 determines that the electrical device is on in step 1708. If the active current $A_2$ drops below the on/off threshold value, then processing system 506 determines that the electrical device has been turned off in step 1710.

The algorithm shown in FIG. 17 allows control unit 100 to be used with many different devices. Because control unit 100 is able to calculate the on/off threshold dynamically as the device is turned on, control unit 100 can be used with devices that have high standby currents as well with devices that have low standby currents.

Although specific embodiments were described herein, the scope of the invention is not limited to those specific embodiments. The scope of the invention is defined by the following claims and any equivalents thereof.

What is claimed is:

1. A control unit adapted to measure a standby current of an electrical device, the control unit comprising:

a current sensing system adapted to sense current drawn by the electrical device through a conductor; and a processing system adapted to measure an active current test value of the active current drawn by the electrical device through the current sensing system, calculate a fractional value of the active current test value that represents an on/off threshold value for the electrical device, monitor the active current to the electrical device to determine if the active current drops below the on/off threshold value, determine that the electrical device is on if the active current stays above the on/off threshold value, and determine that the electrical device has been shut off if the active current drops below the on/off threshold value.

2. The control unit of claim 1 further comprising:

a cutoff system adapted to interrupt content to the electrical device;

wherein the processing system is further adapted to instruct the cutoff system to interrupt the content to the electrical device responsive to determining that the electrical device has been shut off.

3. The control unit of claim 1 further comprising:

a cutoff system adapted to interrupt power to the electrical device;

wherein the processing system is further adapted to instruct the cutoff system to interrupt the power to the electrical device responsive to determining that the electrical device has been shut off.

4. The control unit of claim 3 wherein:

the processing system is further adapted to wait a threshold time period before instructing the cutoff system to interrupt power to the electrical device responsive to determining that the electrical device has been shut off.

5. A method of operating a control unit to determine the standby current of an electrical device, the method comprising:

determining that the electrical device is turned on;

measuring an active current test value of the active current drawn by the electrical device;

calculating a fractional value of the active current test value, which represents an on/off threshold value for the electrical device;

monitoring the active current to the electrical device to determine if the active current drops below the on/off threshold value;

determining that the electrical device is on if the active current stays above the on/off threshold value; and determining that the electrical device has been shut off if the active current drops below the on/off threshold value.

6. The method of claim 5 further comprising:

interrupting content to the electrical device responsive to determining that the electrical device has been shut off.

7. The method of claim 5 further comprising:

interrupting power to the electrical device responsive to determining that the electrical device has been shut off.

8. The method of claim 7 wherein interrupting power to the electrical device includes:

waiting a threshold time period before interrupting power to the electrical device responsive to determining that the electrical device has been shut off.

* * * * *